(12) United States Patent
Belz

(10) Patent No.: US 8,841,879 B2
(45) Date of Patent: Sep. 23, 2014

(54) CONTROL CIRCUIT OPERABLE TO CHARGE A BATTERY AT MULTIPLE CHARGE RATES

(75) Inventor: Jeffrey John Belz, Eastpointe, MI (US)

(73) Assignee: Masco Canada Limited, London, Ontario (CA)

( * ) Notice: Subject to any disclaimer, the term of this patent is extended or adjusted under 35 U.S.C. 154(b) by 1190 days.

(21) Appl. No.: 12/719,190

(22) Filed: Mar. 8, 2010

(65) Prior Publication Data

US 2011/0215770 A1    Sep. 8, 2011

(51) Int. Cl.
*H02J 7/00*    (2006.01)
*H02J 7/14*    (2006.01)

(52) U.S. Cl.
CPC ............... *H02J 7/00* (2013.01); *H02J 7/0055* (2013.01); *H02J 2007/0095* (2013.01)
USPC ............ 320/106; 320/125; 320/107; 320/127

(58) Field of Classification Search
CPC ....... H02J 7/007; H02J 7/0055; H02J 7/0052; H02J 7/0047; H02J 7/0026; H02J 7/0021; H02J 2007/0095; H02J 2007/0067
USPC ......... 320/125, 106, 107, 110, 112, 113, 114, 320/115, 126, 127, 128, 123, 134, 135, 136, 320/116
See application file for complete search history.

(56) References Cited

U.S. PATENT DOCUMENTS

| | | |
|---|---|---|
| 4,321,523 A | 3/1982 | Hammel |
| 5,227,712 A | 7/1993 | Boman |
| 5,396,164 A | 3/1995 | Anegawa |
| 5,420,494 A | 5/1995 | Lu |
| 5,684,382 A | 11/1997 | Fritz et al. |
| 5,847,543 A * | 12/1998 | Carroll ........................ 320/125 |
| 6,300,689 B1 | 10/2001 | Smalser |
| 6,765,307 B2 | 7/2004 | Gerber et al. |
| 6,913,203 B2 | 7/2005 | DeLangis |
| 7,002,265 B2 * | 2/2006 | Potega ........................ 307/149 |
| 7,075,768 B2 | 7/2006 | Kaneko |
| 7,233,078 B2 | 6/2007 | Baarman et al. |
| 7,355,523 B2 | 4/2008 | Sid |
| 7,458,520 B2 | 12/2008 | Belz et al. |
| 7,462,945 B2 | 12/2008 | Baarman et al. |
| 7,535,122 B2 | 5/2009 | Visairo-Cruz et al. |
| 2004/0217738 A1* | 11/2004 | Cheiky et al. ................. 320/128 |
| 2007/0176774 A1 | 8/2007 | Jahrling et al. |
| 2008/0061558 A1* | 3/2008 | Baarman et al. ................. 290/54 |
| 2008/0143109 A1 | 6/2008 | Pitchford et al. |
| 2008/0272733 A1* | 11/2008 | Huang .......................... 320/102 |
| 2009/0039705 A1* | 2/2009 | Lyman et al. ................... 307/64 |

(Continued)

*Primary Examiner* — Edward Tso
*Assistant Examiner* — Alexis Boateng
(74) *Attorney, Agent, or Firm* — Carlson, Gaskey & Olds, P.C.

(57) ABSTRACT

A method of charging a battery at multiple charges rates includes determining a type of power source connected to a charging circuit and determining a voltage of a battery to be charged by the power source. A desired charging voltage is determined in response to the power source type and the battery voltage. A difference between the desired charging voltage and the battery voltage is determined. A digital potentiometer is selectively commanded to adjust the desired charging voltage to vary the difference and alter a charging rate of the battery, such that the difference is increased to increase the charging rate or is decreased to decrease the charging rate.

10 Claims, 6 Drawing Sheets

(56) References Cited

U.S. PATENT DOCUMENTS

| | | | |
|---|---|---|---|
| 2009/0108804 A1* | 4/2009 | Aradachi et al. | 320/106 |
| 2009/0195230 A1 | 8/2009 | Adkins et al. | |
| 2009/0272445 A1* | 11/2009 | Shimizu et al. | 137/801 |
| 2009/0289603 A1* | 11/2009 | Mahowald | 320/151 |
| 2009/0295330 A1* | 12/2009 | Li et al. | 320/124 |
| 2010/0109601 A1* | 5/2010 | Coyle et al. | 320/102 |

* cited by examiner

CONTROL CIRCUIT OPERABLE TO CHARGE A BATTERY AT MULTIPLE CHARGE RATES

BACKGROUND

This application relates to battery charging, and more particularly to a control circuit operable to charge a battery at multiple charge rates.

If an electric generator is used to charge a battery, it may be difficult to predict the output of the generator, since the generator output may rely on environmental conditions such as an amount of available light if the generator includes photovoltaic cells, a flow of fluid if the generator is a hydroelectric generator, or an amount of wind if the generator includes a wind turbine.

SUMMARY

A method of charging a battery at multiple charge rates includes determining a type of power source connected to a charging circuit and determining a voltage of a battery to be charged by the power source. A desired charging voltage is determined in response to the power source type and the battery voltage. A difference between the desired charging voltage and the battery voltage is determined. A digital potentiometer is selectively commanded to adjust the desired charging voltage to vary the difference and alter a charging rate of the battery, such that the difference is increased to increase the charging rate or is decreased to decrease the charging rate.

A control circuit operable to charge a battery at multiple charge rates includes a power source having a power source voltage and a voltage regulator. The voltage regulator produces a charging voltage in response to the power source voltage exceeding a voltage threshold. A digital potentiometer provides a feedback voltage to the voltage regulator such that the digital potentiometer is operable to dynamically adjust the charging voltage and a corresponding charging rate of the charging voltage. A charge enable circuit is operable to enable or disable a charging current of the charging voltage from charging a battery. A microcontroller is operable to control the charge enable circuit and the digital potentiometer. The microcontroller determines a type of power source, determines the charging voltage and corresponding charging rate in response to the type of power source and a voltage of the battery, and commands the digital potentiometer to adjust the charging voltage such that a difference between the charging voltage and a voltage of the battery may be varied to alter a charging rate of the battery.

A method of charging a battery at multiple charge rates determines a difference between a desired charging voltage from a power source and a voltage of a battery to be charged. The desired charging voltage is selectively adjusted to vary the difference and alter a charging rate of the battery, such that the difference is increased to increase the charging rate or is decreased to decrease the charging rate. A check is performed to verify that the charging rate does not cause the power source to exceed its maximum power output.

These and other features of the present invention can be best understood from the following specification and drawings, the following of which is a brief description.

DETAILED DESCRIPTION

Figure 1:
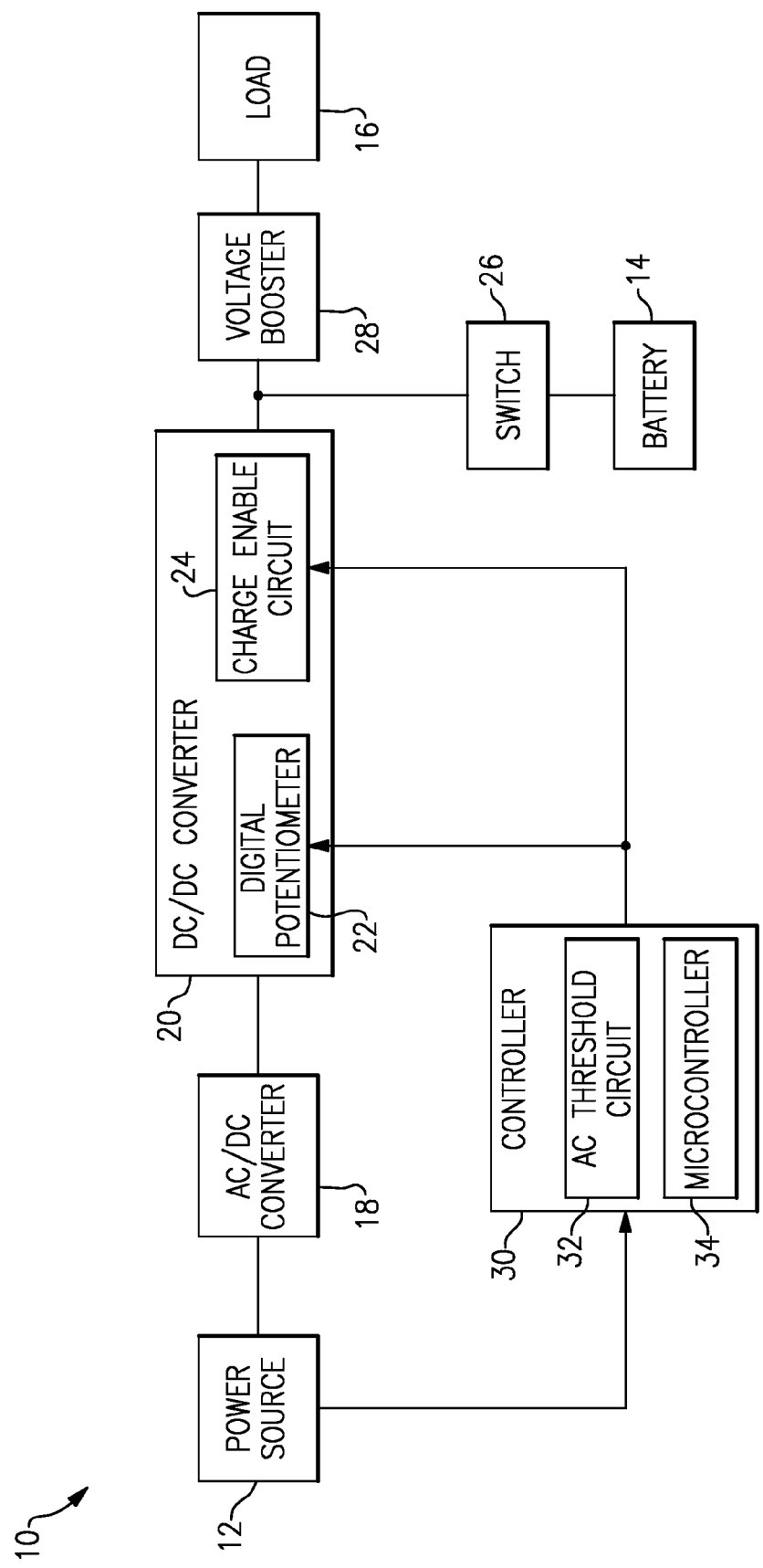
FIG. 1 schematically illustrates a circuit operable to charge a battery at multiple charge rates.

FIG. 1 schematically illustrates a circuit 10 operable to charge a battery at multiple charge rates. The circuit includes an alternating current ("AC") power source 12 that is operable to charge a battery 14 which powers a load 16. In one example the power source 12 is a hydroelectric generator operable to harvest energy from a flow of fluid, such as water, and the load 16 is an electric faucet operable to control a flow of water. Of course, these are only examples and other power sources and loads would be possible.

An AC/DC converter 18 converts an AC current from the power source into a direct current ("DC") voltage and DC current. A DC/DC converter 20, which includes a digital potentiometer 22, adjusts the DC voltage to be a desired charging voltage. A charge enable circuit 24 enables or disables the power source 12 from charging the battery 14. A switch 26 is operable to disconnect the battery 14 from the load 16. In one example the switch 26 is an air gap switch such that no leakage current may flow to the load when the switch 26 is OFF. A voltage booster 28 is operable to increase the voltage output by battery 14 to the load 16. A controller 30 is operable to control the DC/DC converter 20 and the charge enable circuit 24. The controller includes an AC threshold circuit 32 and a microcontroller 34.

Figure 2:
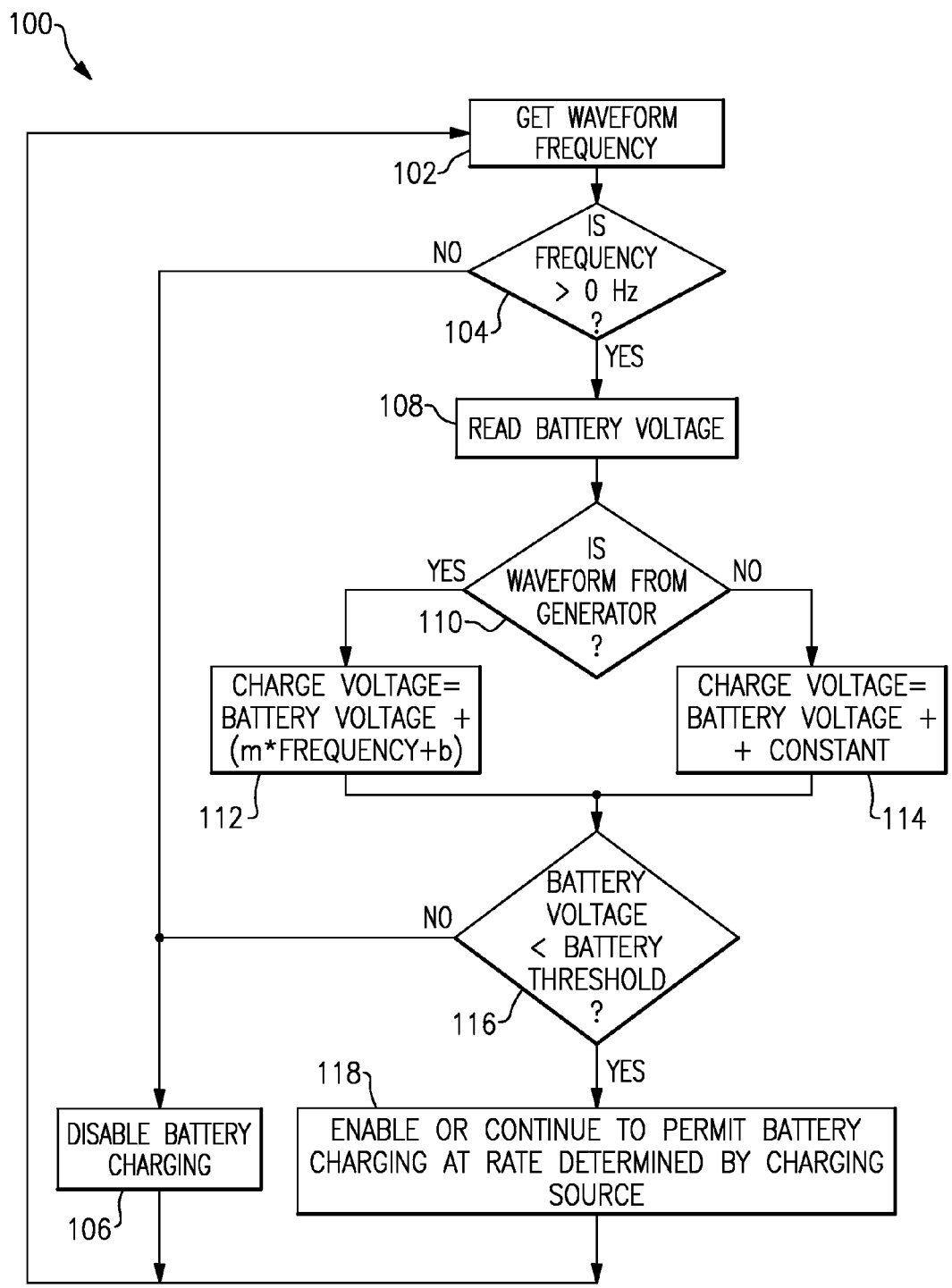
FIGS. 2-3 schematically illustrate a method of operating the circuit of FIG. 1 to charge a battery at multiple charge rates.
Figure 3:
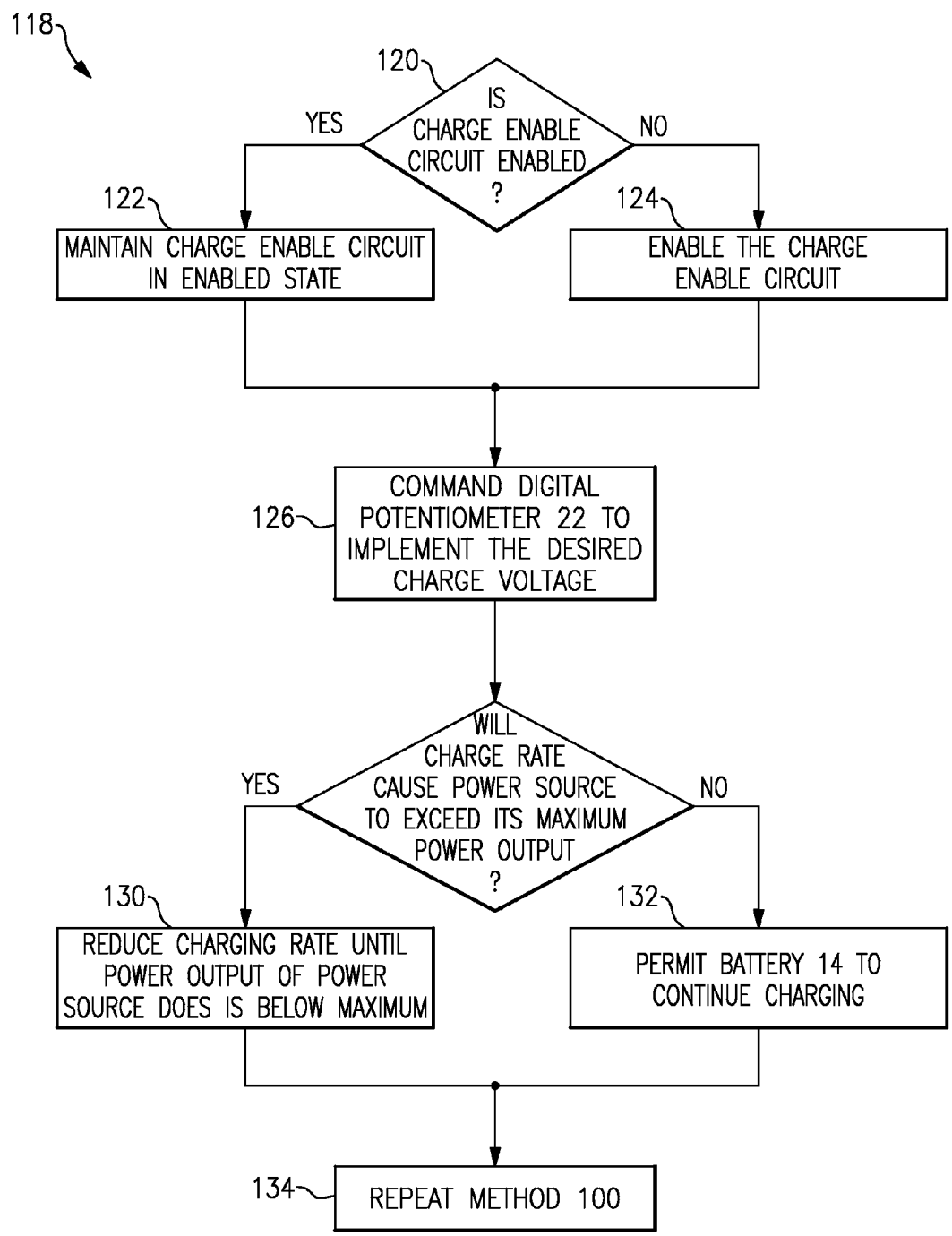

FIGS. 2-3 schematically illustrate a method 100 of operating the circuit 10 of FIG. 1 to charge the battery 14 at multiple charge rates. A waveform frequency of AC current from the power source 12 is obtained (step 102). To perform step 102, the controller 30 receives inputs AC1, AC2 from the power source 12 (see FIGS. 4-5). The inputs AC1, AC2 are received into AC threshold circuit 32 which includes a zener diode 36 and an optocoupler 38. The optocoupler 38 electrically isolates the microcontroller 34 from the AC input voltage from the power source 12.

Figure 5:
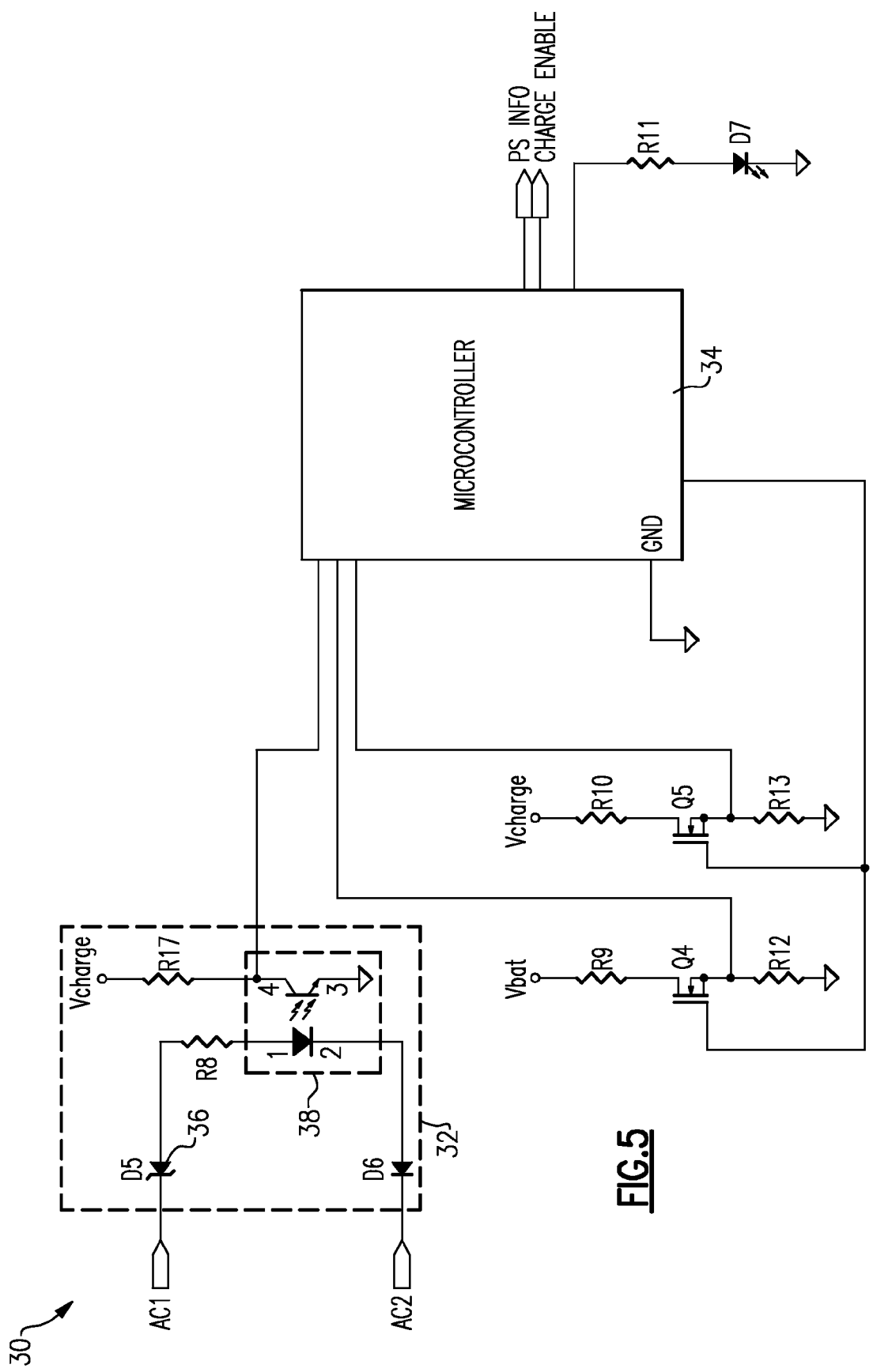
FIG. 5 schematically illustrates an example controller of the circuit of FIG. 1.

Referring to FIG. 5, the zener diode 36 implements a voltage threshold in the circuit 10. The zener diode 36 is oriented to prevent a flow of current from the input AC1 through the optocoupler 38 unless a voltage of the input AC1 exceeds a breakdown voltage of the zener diode 36. If the voltage of input AC1 is less than the threshold, the zener diode 36 blocks a flow of current, and a frequency of the power source 12 is interpreted as being zero (step 104) and the charge enable circuit 24 is disabled (step 106) so that the battery will not be charged. This feature may be useful if the power source 12 is a generator, and if one wishes to not draw any current from the generator until the generator is outputting at least a minimum voltage.

If the voltage of input AC1 exceeds the breakdown voltage of zener diode 36, then current flows from optocoupler to the microcontroller 34, and the microcontroller 34 determines a frequency of the current (step 104). A voltage of the battery 14 is measured (step 108). A comparison is performed to determine if the frequency of the current is representative of a generator (step 110). In one example step 110 defines the power source 12 to be a generator in response to the frequency being within a first range (e.g. on the order of 60 Hz) and defines the power source 12 to be a constant output power source (e.g. 24 VAC plug in power source) in response to the frequency being within a second range (e.g. on the order of 300 Hz) that is higher than the first range. Of course, these are only examples and other ranges and power sources could be used.

If the power source 12 is determined to be a generator, then a desired charging voltage of the circuit 10 is defined as shown in equation #1 below (step 112) such that a charging rate of the charging voltage varies depending on a frequency of current from the power source 12 at a given voltage of battery 14.

$$CV=BV+(m*\text{Frequency}+b) \qquad \text{equation #1}$$

where CV is a charging voltage of the circuit 10;
BV is a voltage of the battery 14;
m is a slope of the charge voltage CV; and
b is an offset of the slope.

If the power source 12 is determined to not be a generator, then a desired charging voltage of the circuit 10 is defined as shown in equation #2 below (step 114) such that the charging rate is constant and does not depend on frequency.

$$CV=BV+z \qquad \text{equation #2}$$

where z is a constant.

A check is performed to determine whether a voltage of the battery 14 exceeds a maximum permissible battery charge (step 116). In one example the maximum permissible charge is determined by a manufacturer of the battery and is stored in the microcontroller 34. If the maximum permissible charge is exceeded then the charge enable circuit 24 is disabled (step 106). If the maximum permissible charge is not exceeded, the charge enable circuit is enabled, or if already enabled is maintained in its enabled state (step 118).

FIG. 3 illustrates step 118 in greater detail. A check is performed to determine if the charge enable circuit 24 is enabled (step 120). If the charge enable circuit 24 is already enabled then it is maintained in its enabled state (step 122), and if the charge enable circuit 24 is disabled then it is enabled (step 124). Step 124 is performed using the "Charge Enable" signal 60 (see FIGS. 4-6). The microcontroller 34 commands the digital potentiometer 22 to adjust a charge voltage to the desired charge voltage of steps 112 or 114 (step 126).

A rate at which the circuit 10 charges the battery 14, or "charging rate" is directly proportional to a difference between the charging voltage and the voltage of battery 14. As this difference increases the charging rate increases, and as this difference decreases the charging rate decreases. However, as charging rate increases a power draw on the power source 12 also increases. Therefore, a check is performed to determine whether a charge rate of the circuit 10 causes the power source 12 to exceed is maximum power output (step 128).

If the power source is exceeding its maximum power output then the charging rate is reduced by reducing a difference between the charging voltage and the battery voltage (step 130). Step 130 is performed by transmitting information about the power source 12 in a signal "PS Info" 62 to the digital potentiometer 22 (see FIGS. 4, 6). Although "PS Info" is shown as a single signal 62, it is understood that the signal 62 could include multiple signals (e.g. a power source type signal, a frequency signal, and a battery voltage signal). If the power source is not exceeding its maximum power output then the battery 14 is permitted to continue charging at the charge rate (step 132). The method 100 is then repeated (step 134).

Figure 4:
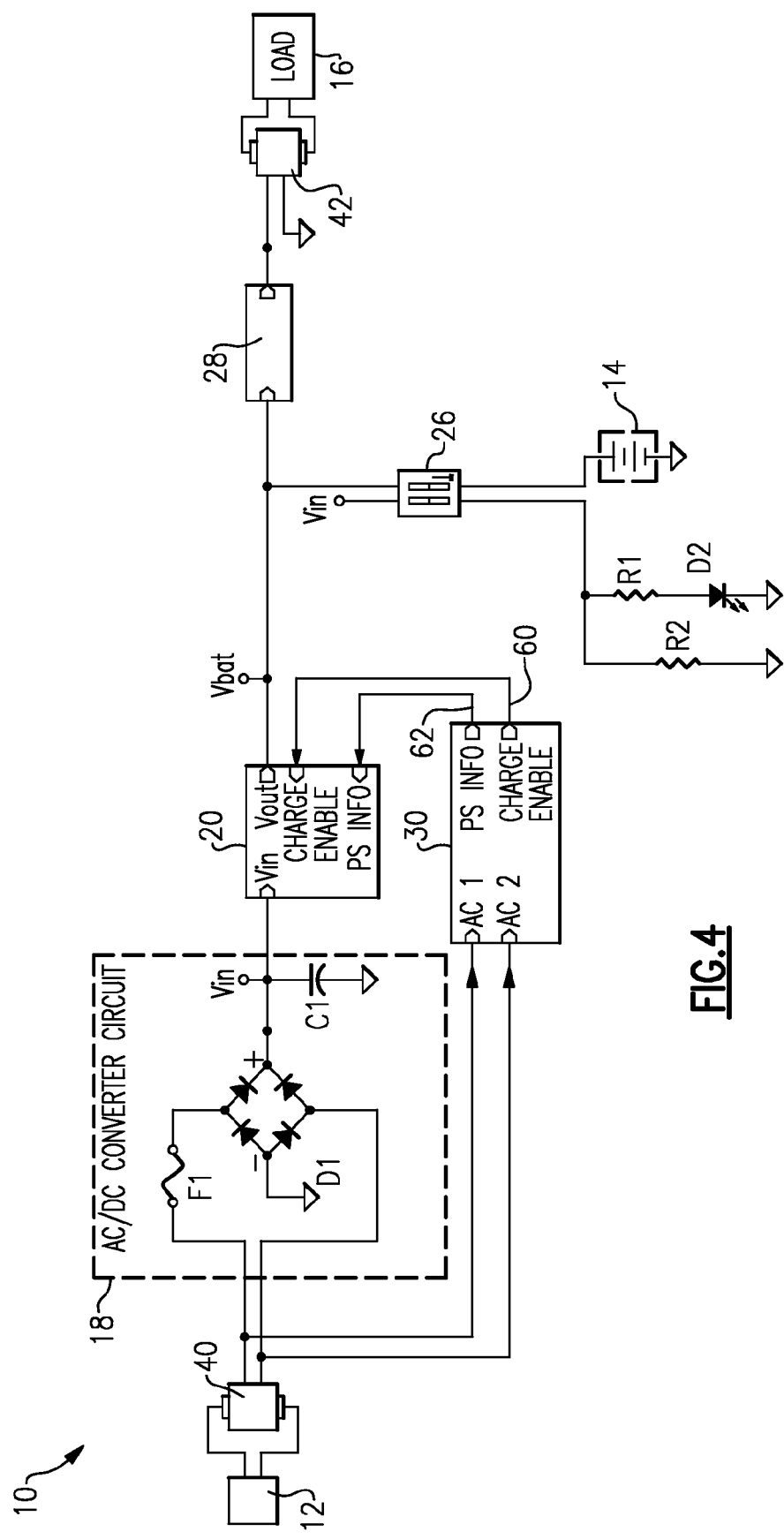
FIG. 4 schematically illustrates the circuit of FIG. 1 in greater detail.

Additional details of the circuit 10 will now be described. Referring to FIG. 4, a light-emitting diode ("LED") D2 may be used to indicate whether the battery is connected or disconnected from the circuit 10. Input connector 40 and output connector 42 may be used to connect the power source 12 and the load 16 to the circuit 10. In one example the connectors 40, 42 are 9-volt battery style connectors. Of course, other connectors could be used.

Referring to FIG. 5, LED D7 may be used to indicate a charging status of the battery 14. In one example, the LED D7 provides a first notification if the battery 14 is charging (e.g. flashing ON and OFF) and may provide a second notification if the battery 14 is fully charged (e.g. remaining ON). Of course, other notifications would be possible.

Figure 6:
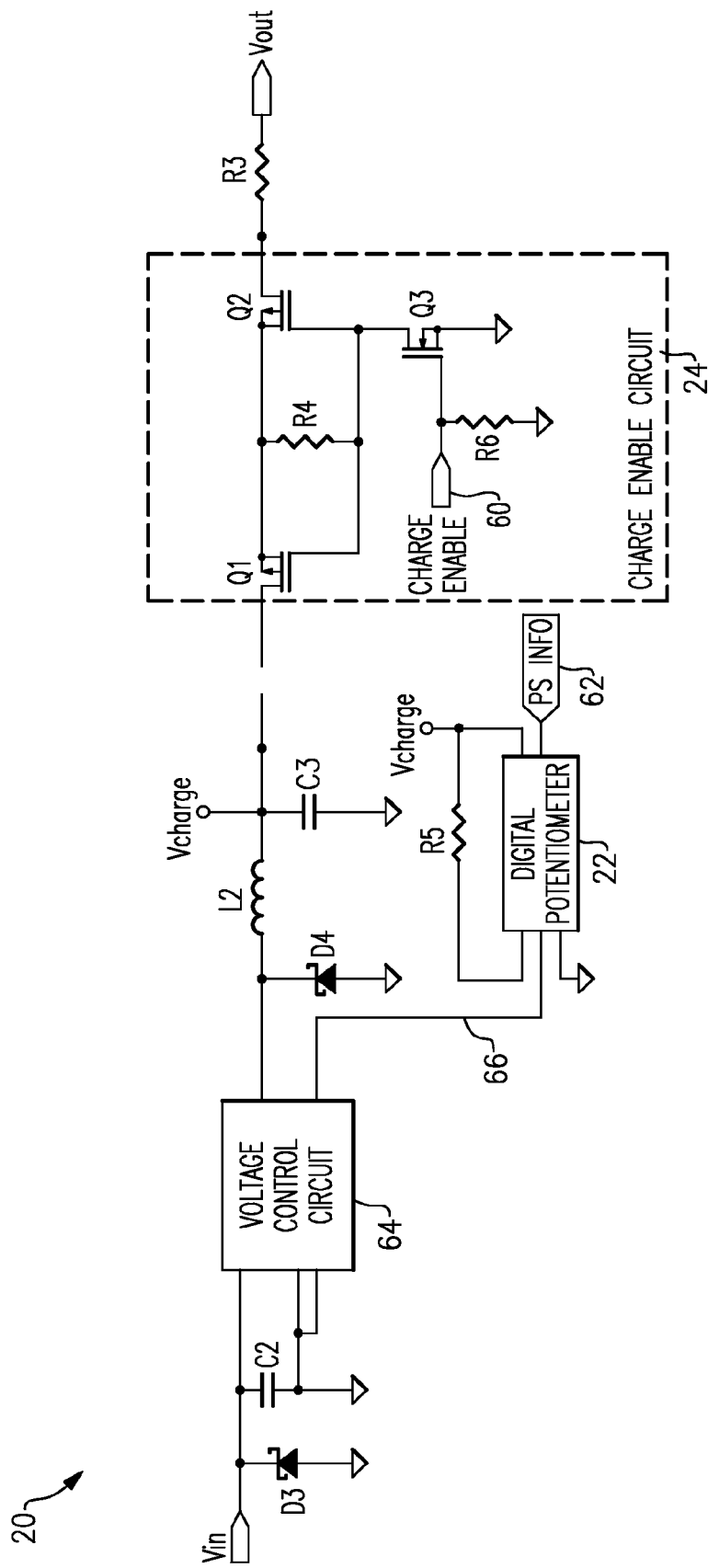
FIG. 6 schematically illustrates a DC/DC converter of the circuit of FIG. 1.

Referring to FIG. 6, a voltage control circuit 64 receives a feedback signal from the digital potentiometer 22 so that the voltage control circuit 64 can implement a desired charging voltage.

Although an embodiment of this invention has been disclosed, a worker of ordinary skill in this art would recognize that certain modifications would come within the scope of this invention. For that reason, the following claims should be studied to determine the true scope and content of this invention.

What is claimed is:

1. A control circuit operable to charge a battery at multiple charge rates, comprising:
   a power source having a power source voltage;
   a voltage regulator configured to produce a charging voltage in response to the power source voltage exceeding a predetermined voltage threshold;
   a digital potentiometer configured to provide a feedback voltage to the voltage regulator such that the digital potentiometer is operable to dynamically adjust the charging voltage and a corresponding charging rate of the charging voltage;
   a charge enable circuit operable to enable and disable a charging current of the charging voltage from charging a battery; and
   a microcontroller operable to control the charge enable circuit and the digital potentiometer, wherein the microcontroller is configured to determine a type of power source and a desired charging voltage and corresponding charging rate in response to the type of power source and a voltage of the battery, and wherein the microcontroller is configured to command the digital potentiometer to adjust an instantaneous charging voltage to correspond to the desired charging voltage such that a difference between the instantaneous charging voltage and a voltage of the battery may be varied to alter a charging rate of the battery.

2. The circuit of claim 1, wherein the type of power source is one of a generator and an AC power source having a constant output not dependent upon environmental conditions, and wherein the microcontroller assigns a dynamic charging voltage and dynamic charging rate in response to detecting the generator, the dynamic charging voltage varying depending on a frequency of current from the power source at a given battery voltage.

3. The circuit of claim 2, wherein the generator is a hydroelectric generator that harvests energy from a flow of a fluid, and wherein the battery powers an electronic faucet load that controls a flow of the fluid.

4. The circuit of claim 1, wherein the microcontroller adjusts the charging voltage such that the charging rate corresponding to the charging voltage does not cause the detected power source to exceed its maximum power output.

5. The circuit of claim 1, wherein the microcontroller determines the type of power source in response to a frequency of current from the power source being within one of a first range and a second range different than the first range.

6. The circuit of claim 1, wherein the voltage regulator is a step-down voltage regulator, and wherein the charging voltage is less than the power source voltage.

7. The circuit of claim 1, including a zener diode located between the power source and the voltage regulator, the zener diode being oriented to prevent a flow of current from the power source to the voltage regulator unless a voltage of the power source exceeds a breakdown voltage of the zener diode.

8. The circuit of claim 1, wherein the charge enable circuit is configured to disable the charging current supplied to the battery when a maximum charge of the battery exceeds a predetermined threshold.

9. The circuit of claim 1, wherein the charge enable circuit is operable to also disable a flow of current from the power source to the load when the flow of charging current to the battery is disabled.

10. The circuit of claim 1, including an AC-to-DC converter electrically disposed between the power source and the voltage regulator.

* * * * *